US012372208B2

(12) United States Patent
Dong

(10) Patent No.: US 12,372,208 B2
(45) **Date of Patent: *Jul. 29, 2025**

(54) LIGHT SOURCE HAVING MULTIPLE DIFFERENTLY-COLORED EMITTERS

(71) Applicant: Lutron Technology Company LLC, Coopersburg, PA (US)

(72) Inventor: Fangxu Dong, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,794

(22) Filed: Jul. 19, 2024

(65) Prior Publication Data

US 2024/0377038 A1 Nov. 14, 2024

Related U.S. Application Data

(63) Continuation of application No. 18/190,553, filed on Mar. 27, 2023, now Pat. No. 12,072,068, which is a (Continued)

(51) Int. Cl.

*F21K 9/233* (2016.01)
*F21K 9/66* (2016.01)
*F21K 9/68* (2016.01)
*H05B 45/20* (2020.01)
*F21V 7/06* (2006.01)
*F21Y 113/17* (2016.01)

(52) U.S. Cl.

CPC ................ *F21K 9/233* (2016.08); *F21K 9/66* (2016.08); *F21K 9/68* (2016.08); *H05B 45/20* (2020.01); *F21V 7/06* (2013.01); *F21Y 2113/17* (2016.08)

(58) Field of Classification Search

CPC ... F21K 9/233; F21K 9/66; F21K 9/68; H05B 45/20; F21V 7/06; F21Y 2113/17
See application file for complete search history.

(56) References Cited

U.S. PATENT DOCUMENTS 9,332,598 B1 5/2016 Ho et al.
9,360,174 B2 6/2016 Dong et al.
(Continued)

FOREIGN PATENT DOCUMENTS

WO 2013052762 A1 4/2013
WO 2016162331 A1 10/2016

*Primary Examiner* — Elmito Breval

(74) *Attorney, Agent, or Firm* — Michael S. Czarnecki; Glen R. Farbanish; Philip N. Smith

(57) ABSTRACT

An emitter module for a light-emitting diode (LED) light source may comprise a substrate, and a plurality of emitters mounted to the substrate, where each emitter is configured to produce illumination at a different wavelength, and the number of emitters is greater than four (e.g., five emitters). The emitter module may also comprise a dome mounted to the substrate and encapsulating the plurality of emitters. Each of the plurality of emitters is arranged such that a center of the emitter is located on a circular center line that has a center that is the same as a center of the dome. Each of the plurality of emitters is located on a different primary radial axis of the emitter module. Each of the primary radial axes of the emitter module is equally spaced apart by an offset angle. The emitter module may also comprise an additional one of each of the emitters at each of the different wavelengths (e.g., ten total emitters).

17 Claims, 5 Drawing Sheets

Related U.S. Application Data continuation of application No. 17/413,904, filed as application No. PCT/US2019/066992 on Dec. 17, 2019, now Pat. No. 11,614,206.

(60) Provisional application No. 62/780,681, filed on Dec. 17, 2018.

(56) References Cited

U.S. PATENT DOCUMENTS

| | | | |
|---|---|---|---|
| 9,470,406 | B2 | 10/2016 | Catalano |
| 9,538,619 | B2 | 1/2017 | Swatsky et al. |
| 9,736,895 | B1 | 8/2017 | Dong et al. |
| 9,769,899 | B2 | 9/2017 | Ho et al. |
| 10,208,922 | B2 | 2/2019 | Gommans |
| 2009/0103296 | A1 | 4/2009 | Harbers et al. |
| 2013/0088142 | A1 | 4/2013 | Allen |
| 2013/0088522 | A1 | 4/2013 | Gettemy et al. |
| 2013/0329415 | A1 | 12/2013 | Lin |
| 2014/0232288 | A1 | 8/2014 | Brandes et al. |
| 2015/0377695 | A1 | 12/2015 | Chang et al. |
| 2015/0382425 | A1 | 12/2015 | Lewis et al. |
| 2016/0066383 | A1 | 3/2016 | Dias et al. |

LIGHT SOURCE HAVING MULTIPLE DIFFERENTLY-COLORED EMITTERS

CROSS-REFERENCE TO RELATED APPLICATIONS

This application is a continuation of U.S. patent application Ser. No. 18/190,553, filed Mar. 27, 2023; which is a continuation of U.S. patent application Ser. No. 17/413,904, filed on Jun. 14, 2021, now U.S. Pat. No. 11,614,206 issued Mar. 28, 2023; which is the National Stage Entry under 35 U.S.C. § 371 of Patent Cooperation Treaty Application No. PCT/US2019/066992, filed Dec. 17, 2019, all of which claim the benefit of U.S. Provisional Patent Application No. 62/780,681, filed Dec. 17, 2018, and the contents of each of which is hereby incorporated by reference herein.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein, an emitter module for a light-emitting diode (LED) light source may comprise a substrate, and a plurality of emitters mounted to the substrate, where each emitter is configured to produce illumination at a different wavelength, and the number of emitters is greater than four (e.g., five emitters). The emitter module may also comprise a dome mounted to the substrate and encapsulating the plurality of emitters. Each of the plurality of emitters is arranged such that a center of the emitter is located on a circular center line that has a center that is the same as a center of the dome. Each of the plurality of emitters is located on a different primary radial axis of the emitter module. Each of the primary radial axes of the emitter module is equally spaced apart by an offset angle.

As further described herein, an emitter module for an LED light source may comprises a substrate, and a plurality of emitters mounted to the substrate, where the plurality of emitters includes a number of pairs of emitters configured to produce illumination at a different wavelength with the emitters of each pair of emitter configured to produce illumination at the same wavelength and the number of pairs of emitters being greater than four (e.g., five pairs of emitters). The emitter module may also comprise a dome mounted to the substrate and encapsulating the plurality of emitters. A first emitter of each of the pairs of emitters may be arranged such that a center of the respective emitter is located on a first circular center line that has a center that is the same as a center of the dome. A second emitter of each of the pairs of emitters may be arranged such that a center of the respective emitter is located on a second circular center line that has a center that is the same as a center of the dome. The second circular center line may have a radius that is bigger than a radius of the first circular center line. Each of the plurality of emitters arranged on the first circular center line may be located on a different primary radial axis of the emitter module. Each of the plurality of emitters arranged on the second circular center line may be located on a different secondary radial axis of the emitter module. Each of the primary radial axes of the emitter module may be equally spaced apart by an offset angle. The primary radial axis of the first emitter of each pair of emitters may extend in the opposite direction of the secondary radial axis of the second emitter of the respective pair of emitters.

Further, an emitter module for an LED light source may comprise a substrate, and a plurality of emitters mounted to the substrate, where the plurality of emitters includes a number of sets of emitters configured to produce illumination at a different wavelength with the emitters of each set of emitter configured to produce illumination at the same wavelength and the number of sets of emitters being greater than four (e.g., five sets of emitters). The emitter module may also comprise a dome mounted to the substrate and encapsulating the plurality of emitters. A first emitter of each of the sets of emitters may arranged such that a center of the respective emitter is located on a first circular center line that has a center that is the same as a center of the dome. A second emitter of each of the sets of emitters may be arranged such that a center of the respective emitter is located on a second circular center line that has a center that is the same as a center of the dome. The second circular center line may have a radius that is bigger than a radius of the first circular center line. Each of the plurality of emitters arranged on the first circular center line may be located on a different primary radial axis of the emitter module. Each of the plurality of emitters arranged on the second circular center line may be located on a different secondary radial axis of the emitter module. Each of the primary radial axes of the emitter module may be equally spaced apart by an offset angle. The primary radial axis of the first emitter of each set of emitters may extend in the opposite direction of the secondary radial axis of the second emitter of the respective set of emitters. Third and fourth emitters of each of the sets of emitters may be arranged such that a center of the respective emitter is located on a third circular center line that has a center that is the same as a center of the dome. The third circular center line may have a radius that is bigger than the radius of the second circular center line.

DETAILED DESCRIPTION

Figure 1:
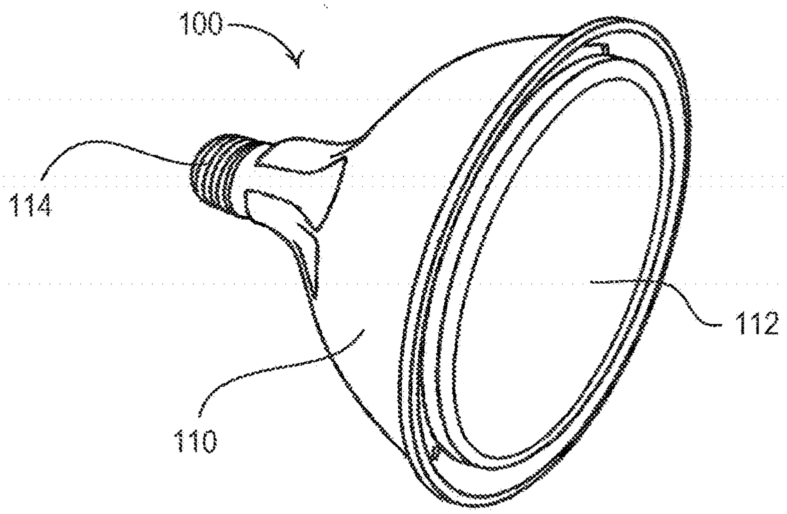
FIG. 1 is a simplified perspective view of an example light source.

FIG. 1 is a simplified perspective view of an example illumination device, such as a light source 100 (e.g., an LED light source). The light source 100 may have a parabolic form factor and may be a parabolic aluminized reflector (PAR) lamp. The light source 100 may include a housing 110 and a lens 112 (e.g., an exit lens), through which light from an internal lighting load (not shown) may shine. The lamp 100 may include a screw-in base 114 that may be configured to be screwed into a standard Edison socket for electrically coupling the lamp 100 to an alternating-current (AC) power source.

Figure 2:
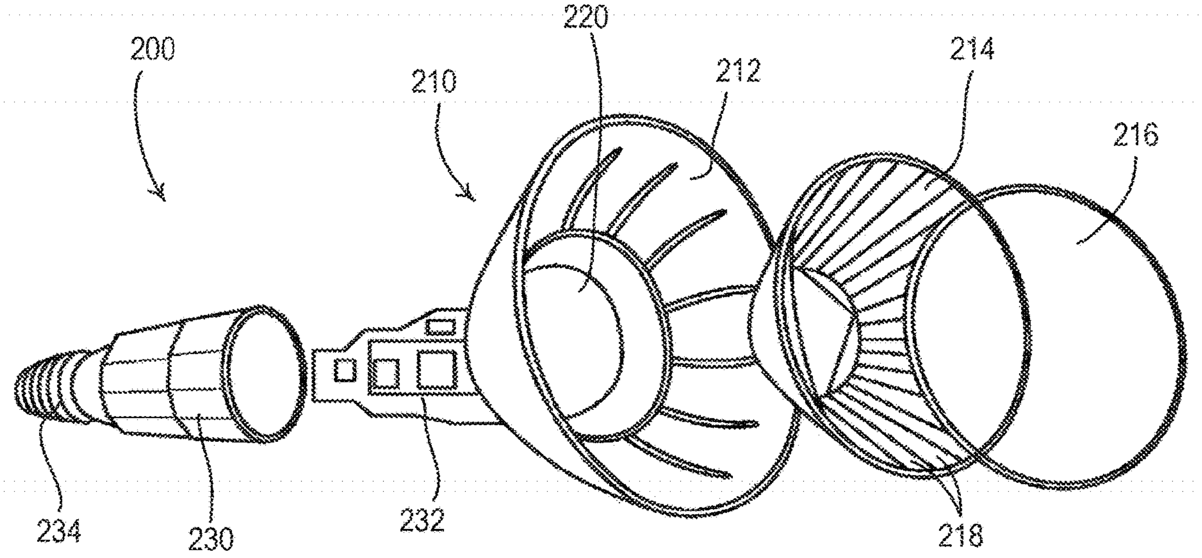
FIG. 2 is an exploded view of another example light source.

FIG. 2 is an exploded view of another example light source 200 (e.g., a LED light source) having a parabolic form factor (e.g., which may have a similar assembly as the light source 100 shown in FIG. 1). The light source 200 may comprise an emitter housing 210 that includes a heat sink 212 and a reflector 214 (e.g., a parabolic reflector), and a lens 216 (e.g., an exit lens). The light source 200 may comprise a lighting load, such an emitter module 220, that may include one or more emission light-emitting diodes (LEDs). The emitter module 220 may be enclosed by the emitter housing 210 and may be configured to shine light through the lens 216. The lens 216 may be made of any suitable material, for example glass. The lens 216 may be transparent or translucent and may be flat or domed, for example. The reflector 214 may shape the light produced by the emission LEDs within the emitter module 220 (e.g., into an output beam). The reflector 216 may comprise planar facets 218 (e.g., lunes) that may provide some randomization of the reflections of the light rays emitted by the emitter module 220 prior to exiting light source 220 through the lens 216. The lens 216 may comprises an array of lenslets (not shown) formed on both sides of the lens. An example of a light source having a lens with lenslets is described in greater detail in U.S. Pat. No. 9,736,895, issued Aug. 15, 2017, entitled COLOR MIXING OPTICS FOR LED ILLUMINATION DEVICE, the entire disclosure of which is hereby incorporated by reference.

The light source 200 may comprise a driver housing 230 that may be configured to house a driver printed circuit board (PCB) 232 on which the electrical circuitry of the light source may be mounted. The light source 200 may include a screw-in base 234 that may be configured to be screwed into a standard Edison socket for electrically coupling the light source 200 to an alternating-current (AC) power source. The screw-in base 234 may be attached to the driver housing 230 and may be electrically coupled to the electrical circuitry mounted to the driver PCB 232. The driver PCB 232 may be electrically connected to the emitter module 120, and may comprise one or more drive circuit and/or one or more control circuits for controlling the amount of power delivered to the emitter LEDs of the emitter module 220. The driver PCB 232 and the emitter module 220 may be thermally connected to the heat sink 212.

Figure 3A:
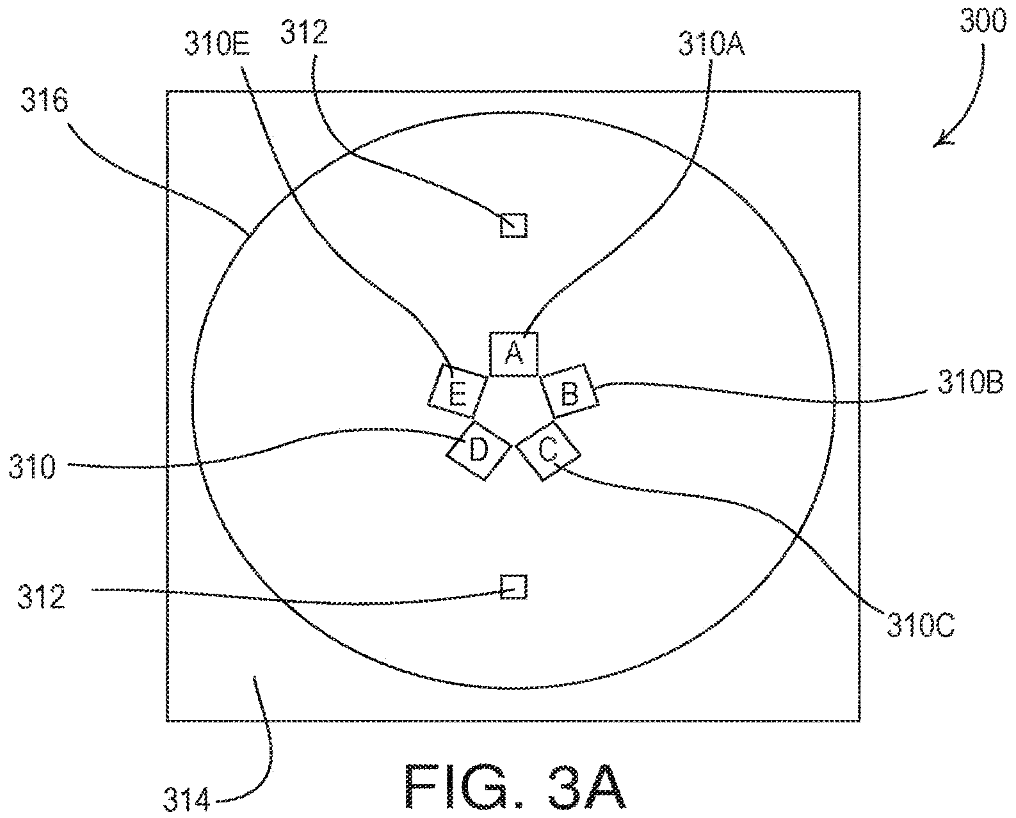
FIGS. 3A-5B are top views of example emitter modules.
Figure 3B:
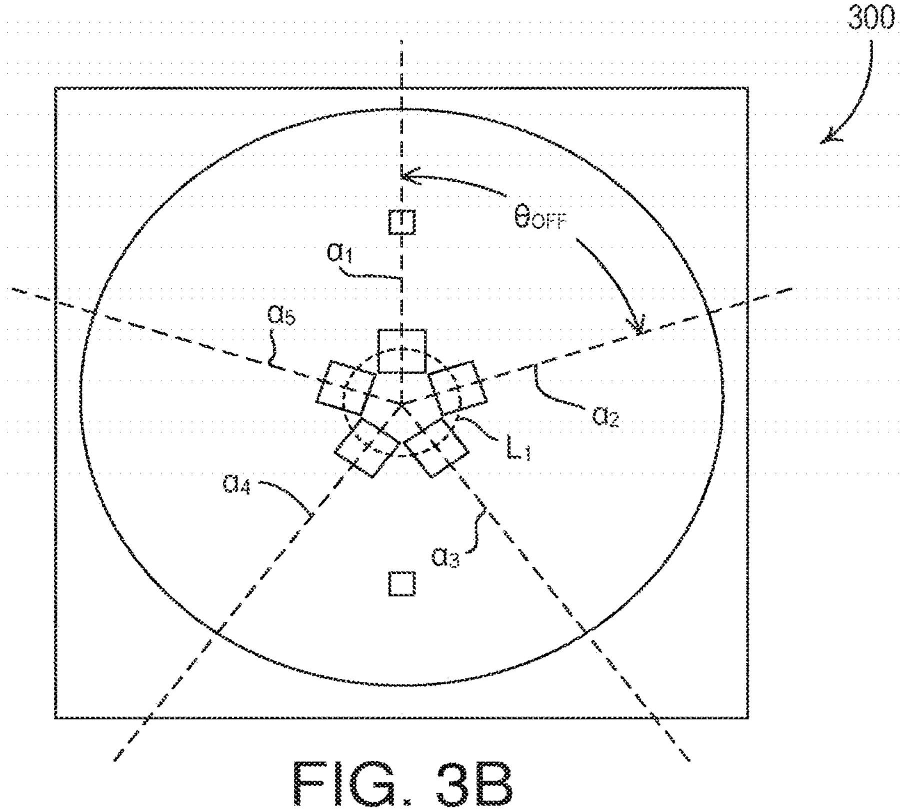

FIG. 3A is a top view of an example emitter module 300 (e.g., the emitter module 220 of the light source 200). FIG. 3B is a top view of the emitter module 300 of FIG. 3A illustrating a number of radial axes of the emitter module. The emitter module 400 may comprise a plurality of emitters 310A-310E (e.g., emission LEDs) of N different colors (e.g., N differently-colored emitters. The emitter module 400 may also comprise a plurality of detectors 312 (e.g., detection LEDs). For example, the emitter module 300 may comprise five emitters 310A-310E and two detectors 312 as shown in FIG. 3A. The emitters 310A-310E and the 312 may be mounted on a substrate 314 and encapsulated by a primary optics structure, such as a dome 316. The emitters 310A-310E, the detectors 312, the substrate 314, and the dome 316 may form an optical system. The emitters 310A-310E may be located as possible together in the center of the dome 326, so as to approximate a centrally-located point source. The detectors 312 may be any device that produces current indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light). For example, the detectors 312 may comprise a red LED and a green LED, which may each be used to measure a respective luminous flux of the light emitted by one of more of the LEDs of the emitters 310.

Each of the emitters 310A-310E may be configured to produce illumination at a different peak emission wavelength (e.g., emit light of different colors), and are labeled with A-E in FIGS. 3A and 3B to illustrate the different colors (e.g., red, green, blue-purple, yellow, and cyan). In addition, the emitter module 400 could include emitters of other sets of five differing colors, for example, red, amber, green, cyan, and blue emitters, or deep red, orange, yellow, green, and blue emitters. The emitters 310A-310E may be arranged such that a center of each of the emitters 310 is located on a circular center line $L_1$ that may have a center that is the same as a center of the dome 326 of the emitter module 300. The circular center line $L_1$ may be characterized by a radius $r_1$. The emitters 310A-310E may be oriented at angles with respect to each other. Each of the emitters 310A-310E may be oriented at an offset angle $\theta_{OFF}$ with respect to the adjacent emitters (e.g., $\theta_{OFF}$=360°/N, where N is the number of emitters 310A-310E in the emitter module 300). For example, when the emitter module 300 has five emitters 310, the offset angle $\theta_{OFF}$ may be approximately 72°.

Each of the emitters 310A-310E of the emitter module 300 may be located on a different radial axis of the emitter module. A radial axis of the emitter module 300 is an axis that starts at the center of the dome 316 and extends outward. The emitters 310A-310B may be located on respective primary radial axes $\alpha_1$-$\alpha_5$ of the emitter module 300. Each of the primary radial axes $\alpha_1$-$\alpha_5$ of the emitter module 300 may be spaced apart (e.g., equally space apart) by approximately the offset angle $\theta_{OFF}$. The first emitter 310A may be located on a first primary radial axis $\alpha_1$, and may be oriented in line with (e.g., at the same angle as) the first primary radial axis (e.g., the sides of the first emitter may be parallel and/or perpendicular with the first primary radial axis) as shown in FIG. 3B. Each of the other emitters 310B-310E may be located on a respective primary radial axis $\alpha_2$-$\alpha_5$, where each additional primary radial axis is offset by an angle $\theta_n$ from the first primary radial axis $\alpha_1$ (e.g., $\theta_n=(n-1)\cdot\theta_{OFF}$, where n ranges from two to N). For example, as shown in FIG. 3B, the second emitter 310B may be located on a second primary radial axis $\alpha_2$ that is offset from the first primary radial axis $\alpha_1$ by an angle $\theta_2$ of 72° (e.g., the offset angle $\theta_{OFF}$); the third emitter 310C may be located on a third primary radial axis $\alpha_3$ that is offset from the first primary radial axis $\alpha_1$ by an angle $\theta_3$ of 144° (e.g., $2\cdot\theta_{OFF}$); the fourth emitter 310D may be located on a fourth primary radial axis $\alpha_4$ that is offset from the first primary radial axis $\alpha_1$ by an angle $\theta_4$ of 216° (e.g., $3\cdot\theta_{OFF}$); and the fifth emitter 310E may be located on a fifth primary radial axis $\alpha_5$ that is offset from the first primary radial axis $\alpha_1$ by an angle $\theta_5$ of 288° (e.g., $4\cdot\theta_{OFF}$). Each of the emitters 310A-310E may be oriented in line with (e.g., at the same angle as) the respective primary radial axis $\alpha_1$-$\alpha_5$ (e.g., the emitter may have sides that are perpendicular and/or parallel to the respective primary radial axis). The emitters 310A-310E may be located as close as possible to each to other, resulting in inner sides of the emitters 310A-310E form a pentagon as shown in FIG. 3A.

Figure 4A:
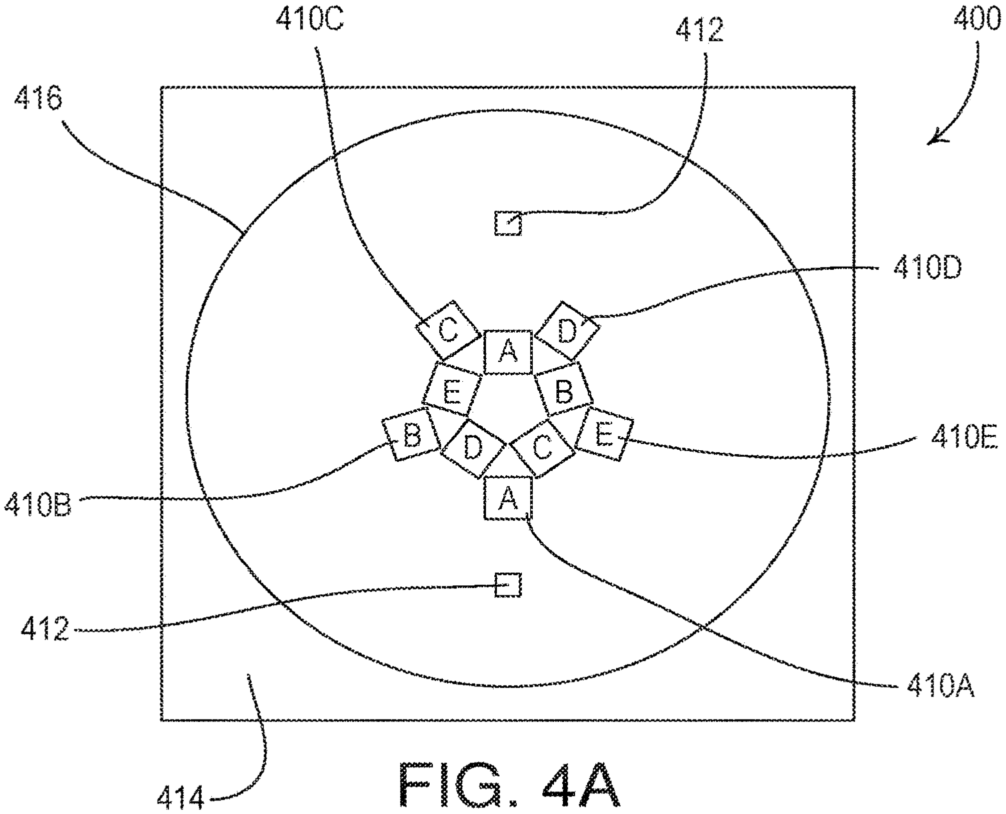
Figure 4B:
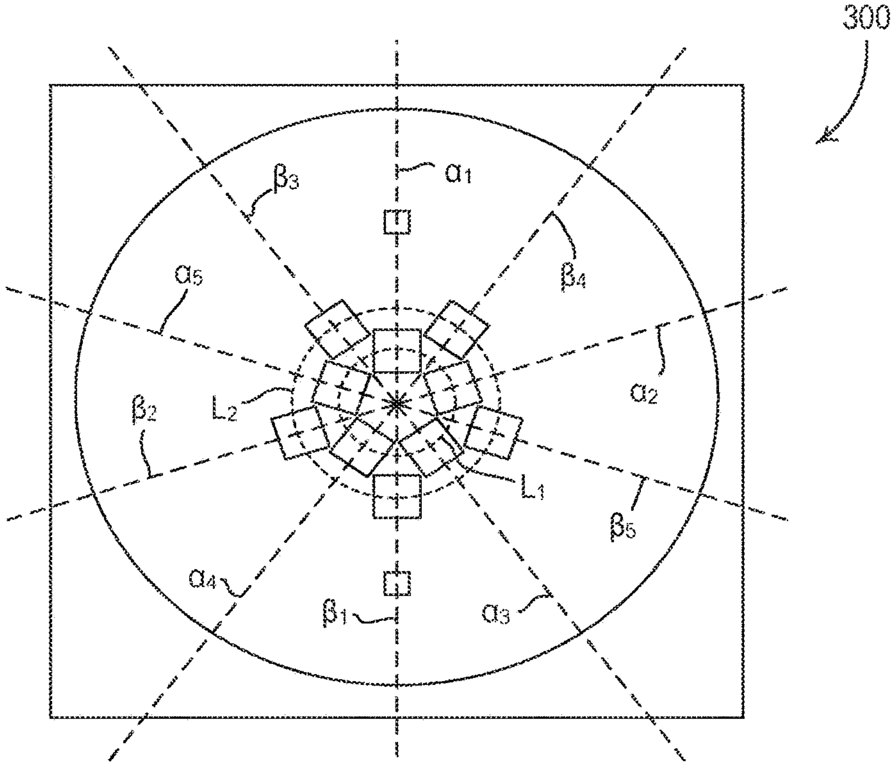

FIG. 4A is a top view of another example emitter module 400 (e.g., the emitter module 220 of the light source 200). FIG. 4B is a top view of the emitter module 400 of FIG. 4A illustrating a number of radial axes of the emitter module. The emitter module 400 may comprise a plurality of emitters 410A-410E (e.g., emission LEDs) of N different colors. For example, the emitter module 400 may comprise the same number of different colors of emitters 410A-410E (e.g., five different colors) as the emitter module 300 of FIGS. 3A and 3B. The emitter module 400 may comprise twice as many total emitters 410A-410E (e.g., ten total emitters) as the emitter module 300 of FIGS. 3A and 3B. In other words, the emitter module 400 may comprise five pairs of differently-colored emitters 410A-410E, where the emitters of each pair produce illumination at the same peak emission wavelength (e.g., emit light of the same color). The emitter module 400 may also comprise a plurality of detectors 412 (e.g., detection LEDs), such as two detectors 412 as shown in FIGS. 4A and 4B. The emitters 410A-410E and the detectors 412 may be mounted on a substrate 414 and encapsulated by a primary optics structure, such as a dome 416. The emitters 410A-410E, the detectors 412, the substrate 414, and the dome 416 may form an optical system. The emitters 410A-410E may be located as possible together in the center of the dome 416, so as to approximate a centrally located point source.

The emitter module 400 may comprise five emitters 410A-410E (e.g., one of each pair of emitters) that are located and arranged in the same manner as the emitters 310A-310E of the emitter module 300 of FIGS. 3A and 3B. For example, the first five emitters 410A-410E may be arranged such that a center of each of those emitters 410A-410E may be located on the first circular center line $L_1$ and on the respective primary radial axis $\alpha_1$-$\alpha_5$, and oriented at the same angle as the respective primary radial axis $\alpha_1$-$\alpha_5$. The second five emitters 410A-410E (e.g., the other emitters of the pairs of emitters) may be arranged such that a center of each of those emitters 410A-410E may be located on a second circular center line $L_2$, which may be characterized by a radius $r_2$ that may be greater than the radius $r_1$ of the first circular center line $L_1$. The second circular center line $L_2$ may have a center that is the same as the center of the dome 416 of the emitter module 400.

Each of the emitters 410A-410E that are arranged on the secondary center line $L_2$ may be located on a respective secondary radial axis $\beta_1$-$\beta_5$ that may extend in an opposite direction as the respective primary radial axis $\alpha_1$-$\alpha_5$ (e.g., the primary radial axis and the secondary radial axis of each pair of emitters are 180° apart). Each of the secondary radial axes $\beta_1$-$\beta_5$ of the emitter module 400 may be equally spaced apart by the offset angle $\theta_{OFF}$. Each of the primary radial axes $\alpha_1$-$\alpha_5$ may be spaced apart from the adjacent secondary radial axes $\beta_1$-$\beta_5$ by a half-offset angle $\theta_{H\text{-}OFF}$ (e.g., $\theta_{OFF}$=180°/N or 36° when N=5). Each of the emitters 410A-410E located on the respective secondary radial axes $\beta_1$-$\beta_5$ may be oriented in line with (e.g., at the same angle as) the respective secondary radial axis $\beta_1$-$\beta_5$ (e.g., the emitter may have sides that are perpendicular and/or parallel to the respective radial axis). As such, the emitters 410A-410E of each pair of emitters may have the same orientation and may be located on a diameter line of the dome 416.

The emitters 410A-410E of each pair of emitters (e.g., emitters having the same color) may be located on opposite sides of the dome 416 (e.g., opposites sides of the center of the dome 416), and may be spaced apart by a distance equal to the sum of the radius $r_1$ of the first circular center line $L_1$ and the radius $r_2$ of the second circular center line $L_2$. The emitters 410A-410E positioned along the second circular center line $L_2$ may be located as close as possible to the emitters that are positioned along the first circular center line $L_1$. The emitters 410A-410E positioned along the second circular center line $L_2$ may be located in gaps formed between adjacent ones of the emitters positioned along the first circular center line $L_1$. For example, the emitter 410A positioned along the second circular center line $L_2$ may be located in a gap formed between the emitters 410C, 410D that are positioned along the first circular center line $L_1$.

The emitters 410A-410E of each pair of emitters may be electrically coupled together in series to form a "chain" of emitters (e.g., series-coupled emitters). The emitters 410A-410E of each chain may conduct the same drive current and may produce illumination at the same peak emission wavelength (e.g., emit light of the same color). The emitters 410A-410E of different chains may emit light of different colors. For example, the emitter module 400 may comprise five differently-colored chains of emitters 410A-410E (e.g., red, green, blue-purple, yellow, and cyan).

Figure 5A:
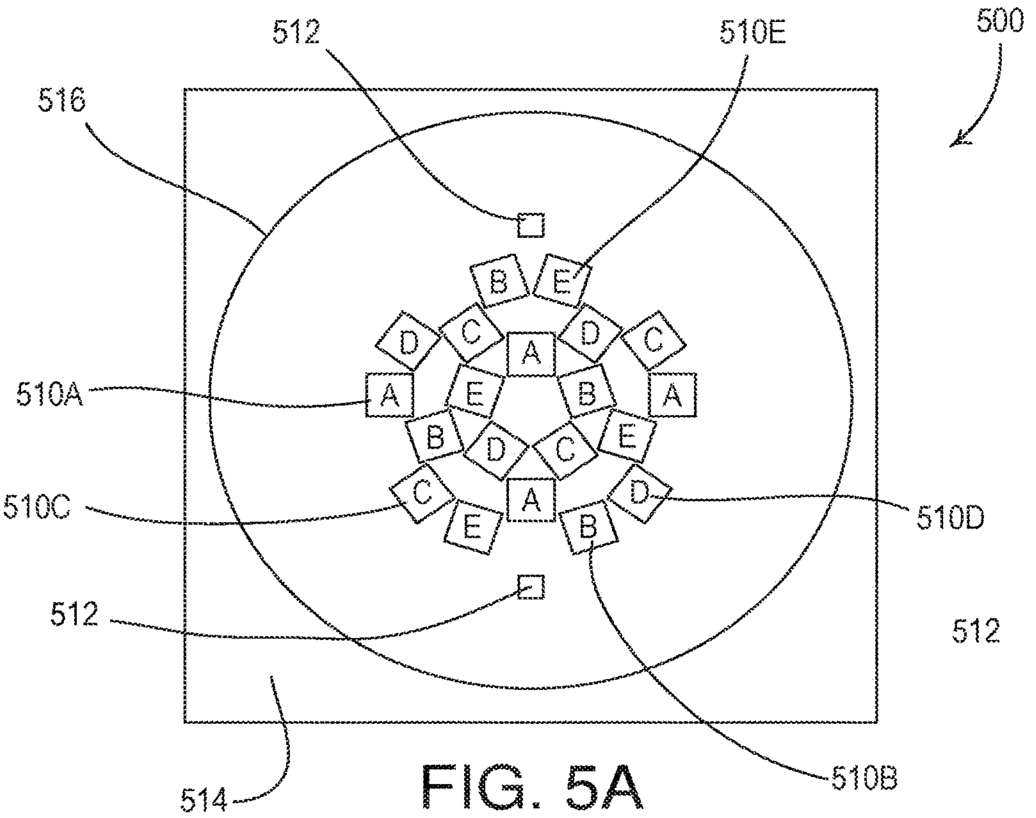
Figure 5B:
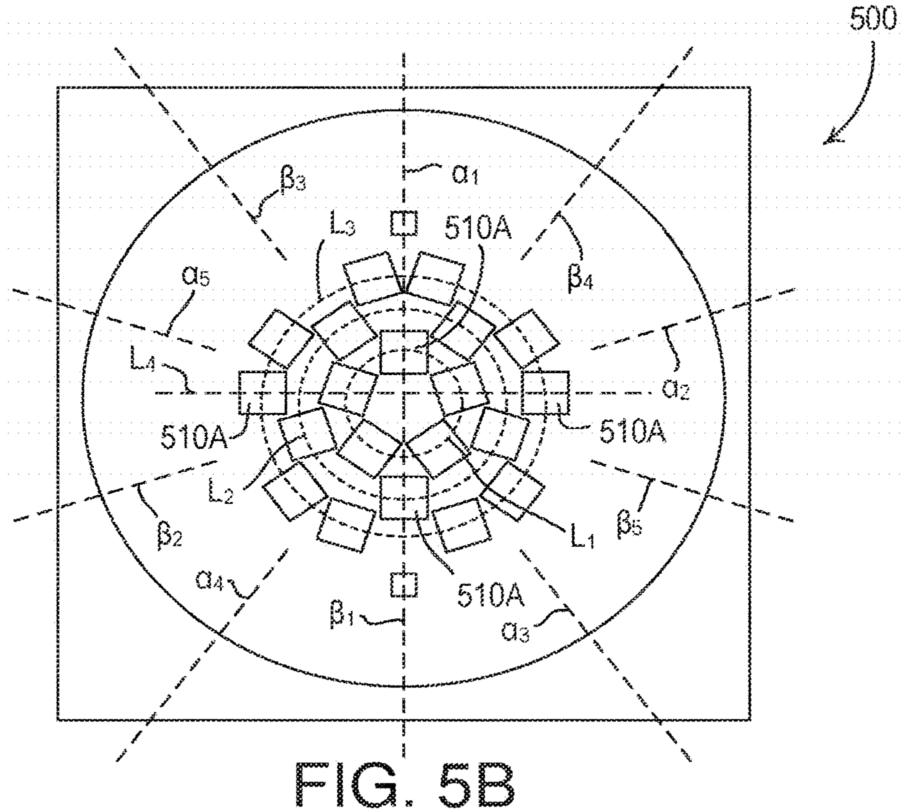

FIG. 5A is a top view of another example emitter module 500 (e.g., the emitter module 220 of the light source 200). FIG. 5B is a top view of the emitter module 500 of FIG. 5A illustrating a number of radial axes of the emitter module. The emitter module 500 may comprise a plurality of emitters 510A-510E (e.g., emission LEDs) of N different colors (e.g., five different colors). The emitter module 500 may comprise twice as many total emitters 510A-510E (e.g., twenty total emitters) as the emitter module 400 of FIGS. 4A and 4B. The emitter module 500 may comprise five sets of differently-colored emitters 510A-510E, where each set of emitters comprises four emitters that produce illumination at the same peak emission wavelength (e.g., emit light of the same color). The emitters 510A-510B of each set of emitters may have the same orientation (e.g., as will be described below). The emitter module 500 may also comprise a plurality of detectors 512 (e.g., detection LEDs), such as two detectors 512 as shown in FIGS. 5A and 5B. The emitters 510A-510E and the detectors 512 may be mounted on a substrate 514 and encapsulated by a primary optics structure, such as a dome 516. The emitters 510A-510E, the detectors 512, the substrate 514, and the dome 516 may form an optical system. The emitters 510A-510E may be located as possible together in the center of the dome 516, so as to approximate a centrally located point source.

Ten of the emitters 510A-510E of the emitter module 500 may be located and arranged in the same manner as the emitters 410A-410E of the emitter module 400 of FIGS. 4A and 4B. For example, five emitters 510A-510E may be arranged such that a center of each of those emitters 510A-510E may be located on the first circular center line $L_1$ and on the respective primary radial axis $\alpha_1$-$\alpha_5$, and oriented at the same angle as the respective primary radial axis $\alpha_1$-$\alpha_5$. In addition, five emitters 510A-510E may be arranged such that a center of each of those emitters 510A-510E may be located on the second circular center line $L_2$ and on the respective secondary radial axis $\beta_1$-$\beta_5$, and oriented at the same angle as the respective secondary radial axis $\beta_1$-$\beta_5$.

The remaining ten emitters 510A-510E of the emitter module 500 may be arranged such that a center of each of those emitters 510A-510E may be located on a third circular center line $L_3$, which may be characterized by a radius $r_3$ that may be greater than the radius $r_2$ of the second circular center line $L_2$. The third circular center line $L_3$ may have a center that is the same as the center of the dome 416 of the emitter module 400. There may be two emitters 510A-510E of each color located on the third circular center line $L_3$. These two emitters 510A-510E of each color located on the third circular center line $L_3$ may have the same orientation as the other two emitters of the same color (e.g., those emitters of the same color located on the first circular center line $L_1$ and the second circular center line $L_2$). Each pair of emitters 510A-510E of the same color on the third circular center line $L_3$ may be located at approximately opposite sides of the third circular center line $L_3$. As a result, one emitter 510A-510E of each of the other colors may be located on the third circular center line $L_3$ between each pair of oppositely-located emitters of the same color on the third circular center line $L_3$.

Each pair of emitters 510A-510E of the same color on the third circular center line $L_3$ may be located on a straight center line that may be perpendicular to the respective primary radial axis $\alpha_1$-$\alpha_5$ of the emitter of the same color on the first circular center line $L_1$ (e.g., and thus perpendicular to the respective secondary radial axis $\beta_1$-$\beta_5$ of the emitter of the same color on the second circular center line $L_2$). For example, as shown in FIG. 5D, the pair of emitters 510A on the third circular center line $L_3$ may be located on a straight center line $L_4$ that may be perpendicular to the first primary radial axis $\alpha_1$ of the emitter 510A on the first circular center line $L_1$ (e.g., and thus perpendicular to the first secondary radial axis $\beta_1$ of the emitter 510A on the second circular center line $L_2$). One of each of the other emitters 510B-510E may be located on the third circular center line $L_3$ between the emitters 510A on each half of the third circular center line $L_3$ as shown in FIGS. 5A and 5B.

Each of the emitters 510A-510E located on the third circular center line $L_3$ may be located adjacent to another emitter of a different color (e.g., to form five pairs of differently-colored emitters on the third circular center line $L_3$). Each pair of adjacent emitters 510A-510E on the third circular center line $L_3$ may be oriented at slightly different angles, and may be centered around one of the primary radial axes $\alpha_1$-$\alpha_5$. The emitters 510A-510E on the third circular center line $L_3$ may be located as close as possible to the emitters on the second circular center line $L_2$. Each pair of adjacent emitters 510A-510E on the third circular center line $L_3$ may be located in gaps formed between differently-colored emitters positioned along the first circular center line $L_1$ and the second circular center line $L_2$. For example, the emitters 510B, 510E on the third circular center line $L_3$ may be located in a gap formed between the emitters 510A, 510C, 510D (e.g., there is one emitter of each color in this group of five emitters).

The emitters 510A-410E of each set of emitters may be electrically coupled together in series to form a "chain" of emitters (e.g., series-coupled emitters). The emitters 510A-510E of each chain may conduct the same drive current and may produce illumination at the same peak emission wavelength (e.g., emit light of the same color). The emitters 510A-510E of different chains may emit light of different colors. For example, the emitter module 500 may comprise five differently-colored chains of emitters 510A-510E (e.g., red, green, blue-purple, yellow, and cyan).

Figure 6:
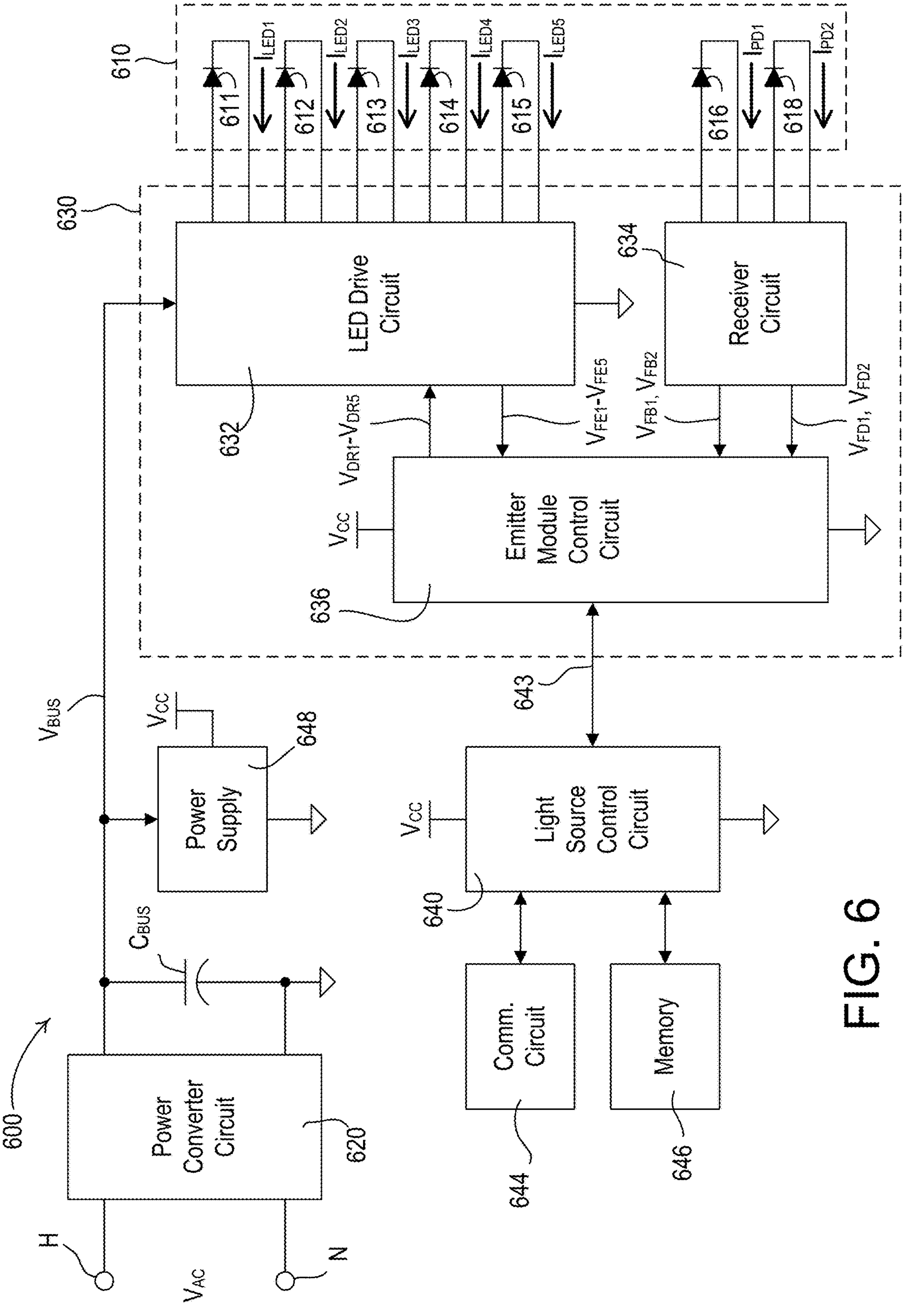
FIG. 6 is a simplified block diagram of an example controllable lighting device.

FIG. 6 is a simplified block diagram of a controllable electrical device, such as a controllable lighting device 600 (e.g., the light source 100 shown in FIG. 1 and/or the light source 200 shown in FIG. 2). The controllable lighting device 600 may comprise one or more emitter modules 610 (e.g., the emitter modules 300, 400, 500 shown in FIGS. 3A-5B). For example, if the controllable lighting device 600 is a PAR lamp (e.g., as shown in FIGS. 1 and 2), the controllable lighting device comprise a single emitter module 610. The emitter module 410 may comprise one or more emitters 611, 612, 613, 614, 615. Each emitter 611-615 is shown in FIG. 4 as a single LED, but may each comprise a plurality of LEDs connected in series (e.g., a chain of LEDs), a plurality of LEDs connected in parallel, or a suitable combination thereof, depending on the particular lighting system. In addition, each emitter 611-615 may comprise one or more organic light-emitting diodes (OLEDs). For example, the first emitter 611 may represent a chain of red LEDs, the second emitter 612 may represent a chain of green LEDs, the third emitter 613 may represent a chain of blue-purple LEDs, the fourth emitter 614 may represent a chain of yellow LEDs, and the fifth emitter 615 may represent a chain of cyan LEDs. The emitters 611-615 may be controlled to adjust an intensity (e.g., a luminous flux) and/or a color (e.g., a color temperature) of a cumulative light output of the controllable lighting device 600. The emitter module 610 may also comprise one or more detectors 616, 618 (e.g., photodiodes, such as a red LED and a green LED) that may produce respective photodiode currents $I_{PD1}$, $I_{PD2}$ (e.g., detector signals) in response to incident light. While two detectors 616, 618 are shown in FIG. 6, the emitter module 610 may comprise less or more detectors.

The controllable lighting device 600 may comprise a power converter circuit 620, which may receive a source voltage, such as an AC mains line voltage $V_{AC}$, via a hot connection H and a neutral connection N, and generate a DC bus voltage $V_{BUS}$ (e.g., approximately 15-20V) across a bus capacitor $C_{BUS}$. The power converter circuit 620 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 620 may provide electrical isolation between the AC power source and the emitters 611-614, and may operate as a power factor correction (PFC) circuit to adjust the power factor of the controllable lighting device 600 towards a power factor of one.

The controllable lighting device 600 may comprise one or more emitter module interface circuits 630 (e.g., one emitter module interface circuit per emitter module 610 in the controllable lighting device 600). The emitter module interface circuit 630 may comprise an LED drive circuit 632 for controlling (e.g., individually controlling) the power delivered to and the luminous flux of the light emitted of each of the emitters 611-615 of the respective emitter module 610. The LED drive circuit 632 may receive the bus voltage $V_{Bus}$ and may adjust magnitudes of respective LED drive currents $I_{LED1}$, $I_{LED2}$, $I_{LED3}$, $I_{LED4}$, $I_{LED5}$ conducted through the LED light sources 611-615. The LED drive circuit 632 may comprise one or more regulation circuits (e.g., five regulation circuits), such as switching regulators (e.g., buck converters) for controlling the magnitudes of the respective LED drive currents $I_{LED1}$-$I_{LED5}$.

The emitter module interface circuit 630 may also comprise a receiver circuit 334 that may be electrically coupled to the detectors 616, 618 of the emitter module 610 for generating respective optical feedback signals $V_{FB1}$, $V_{FB2}$ in response to the photodiode currents $I_{PD1}$, $I_{PD2}$. The receiver circuit 634 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 630 may also comprise an emitter module control circuit 636 for controlling the LED drive circuit 332 to control the intensities of the emitters 611-614 of the emitter module 610. The emitter module control circuit 636 may comprise, for example, a microprocessor, a microcontroller, a programmable logic device (PLD), an application specific integrated circuit (ASIC), a field-programmable gate array (FPGA), or any other suitable processing device or controller. The emitter module control circuit 636 may generate one or more drive signals $V_{DR1}$, $V_{DR2}$, $V_{DR3}$, $V_{DR4}$, $V_{DR5}$ for controlling the respective regulation circuits in the LED drive circuit 632. The emitter module control circuit 336 may receive the optical feedback signals $V_{FB1}$, $V_{FB2}$ from the receiver circuit 634 for determining the luminous flux $L_E$ of the light emitted by the emitters 611-614. The emitter module control circuit 636 may have one or more gain compensation circuits 638 that may receive the respective optical feedback signals $V_{FB1}$, $V_{FB2}$ and generate values that indicate the luminous flux $L_E$ of the light emitted by the emitters 611-615.

The emitter module control circuit 636 may also receive a plurality of emitter forward-voltage feedback signals $V_{FE1}$, $V_{FE2}$, $V_{FE3}$, $V_{FE4}$, $V_{FE5}$ from the LED drive circuit 632 and a plurality of detector forward-voltage feedback signals $V_{FD1}$, $V_{FD2}$ from the receiver circuit 634. The emitter forward-voltage feedback signals $V_{FE1}$-$V_{FE5}$ may be representative of the magnitudes of the forward voltages of the respective emitters 611-615, which may indicate temperatures $T_{E1}$, $T_{E2}$, $T_{E3}$, $T_{E4}$, $T_{E5}$ of the respective emitters. If each emitter 611-615 comprises multiple LEDs electrically coupled in series, the emitter forward-voltage feedback signals $V_{FE1}$-$V_{FE5}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 616-618, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 616, 618.

The controllable lighting device 600 may comprise a light source control circuit 640 that may be electrically coupled to the emitter module control circuit 636 of each of the one or more emitter module interface circuits 630 via a communication bus 642 (e.g., an $I^2C$ communication bus). The light source control circuit 640 may be configured to control the emitter modules 630 to control the intensity (e.g., the luminous flux) and/or color of the cumulative light emitted by the controllable lighting device 600. The light source control circuit 640 may comprise, for example, a microprocessor, a microcontroller, a programmable logic device (PLD), an application specific integrated circuit (ASIC), a field-programmable gate array (FPGA), or any other suitable processing device or controller. The light source control circuit 640 may be configured to adjust (e.g., dim) a present intensity $L_{PRES}$ of the cumulative light emitted by the controllable lighting device 600 towards a target intensity $L_{TRGT}$, which may range across a dimming range of the controllable light source, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The light source control circuit 640 may be configured to adjust a present color temperature $T_{PRES}$ of the cumulative light emitted by the controllable lighting device 600 towards a target color temperature $T_{TRGT}$, which may range between a cool-white color temperature (e.g., approximately 3100-4500 K) and a warm-white color temperature (e.g., approximately 2000-3000 K).

The controllable lighting device 600 may comprise a communication circuit 634 coupled to the light source control circuit 640. The communication circuit 634 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. The communication circuit 634 may be coupled to the hot connection H and the neutral connection N of the controllable lighting device 600 for transmitting a control signal via the electrical wiring using, for example, a power-line carrier (PLC) communication technique. The light source control circuit 640 may be configured to determine the target intensity $L_{TRGT}$ for the controllable lighting device 600 in response to messages (e.g., digital messages) received via the communication circuit 634.

The controllable lighting device 600 may comprise a memory 646 configured to store operational characteristics of the controllable lighting device 600 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the light source control circuit 640. The controllable lighting device 600 may comprise a power supply 648 that may receive the bus voltage $V_{Bus}$ and generate a supply voltage $V_{CC}$ for powering the light source control circuit 640 and other low-voltage circuitry of the controllable lighting device.

When the controllable lighting device 600 is on, the light source control circuit 640 may be configured to control the emitter modules 610 to emit light substantially all of the time. The light source control circuit 640 may be configured to control the emitter modules 610 to disrupt the normal emission of light to measure one or more operational characteristics of the emitter modules during periodic measurement intervals. For example, during the measurement intervals, the emitter module control circuit 636 may be configured to individually turn on each of the different-colored emitters 611-615 of the emitter modules 610 (e.g., while turning of the other emitters) and measure the luminous flux of the light emitted by that emitter using one of the two detectors 616, 618. For example, the emitter module control circuit 636 may turn on the first emitter 611 of the emitter module 610 (e.g., at the same time as turning off the other emitters 612-615) and determine the luminous flux $L_E$ of the light emitted by the first emitter 611 from the first gain compensation circuit 638 in response to the first optical feedback signal $V_{FB1}$ generated from the first detector 616. In addition, the emitter module control circuit 636 may be configured to drive the emitters 611-615 and the detectors 616, 618 to generate the emitter forward-voltage feedback signals $V_{FE1}$-$V_{FE5}$ and the detector forward-voltage feedback signals $V_{FD1}$, $V_{FD2}$ during the measurement intervals. Methods of measuring the operational characteristics of emitter modules in a light source are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES, the entire disclosure of which is hereby incorporated by reference.

Calibration values for the various operational characteristics of the controllable lighting device 600 may be stored in the memory 646 as part of a calibration procedure performed during manufacturing of the controllable lighting device 600. Calibration values may be stored for each of the emitters 611-615 and/or the detectors 616, 618 of each of the emitter modules 630. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 611-615 using an external calibration tool, such as a spectrophotometer. The values for the emitter forward voltages, photodiode currents, and detector forward voltages may be measured internally to the controllable lighting device 600. The calibration values for each of the emitters 611-615 and/or the detectors 616, 618 may be measured at a plurality of different drive currents, e.g., at 100%, 30%, and 10% of a maximum drive current for each respective emitter.

In addition, the calibration values for each of the emitters 611-615 and/or the detectors 616, 618 may be measured at a plurality of different operating temperatures. The controllable lighting device 600 may be operated in an environment that is controlled to multiple calibration temperatures and value of the operational characteristics may be measured and stored. For example, the controllable lighting device 300 may be operated at a cold calibration temperature $T_{CAL-COLD}$, such as room temperature (e.g., approximately 25° C.), and a hot calibration temperature $T_{CAL-HOT}$ (e.g., approximately 85° C.). At each temperature, the calibration values for each of the emitters 611-615 and/or the detectors 616, 618 may be measured at each of the plurality of drive currents and stored in the memory 646.

After installation, the light source control circuit 640 of the controllable lighting device 600 may use the calibration values stored in the memory 646 to maintain a constant light output from the emitter modules 610. The light source control circuit 640 may determine target values for the luminous flux to be emitted from the emitters 611-615 to achieve the target intensity $L_{TRGT}$ and/or the target color temperature $T_{TRGT}$ for the controllable lighting device 600. The light source control circuit 640 may determine the magnitudes for the drive currents $I_{DR}$ for each of the emitters 611-615 based on the determined target values for the luminous flux to be emitted from the emitters 611-615. When the age of the controllable lighting device 600 is zero, the magnitudes of the drive currents IDR for the emitters 611-615 may be controlled to initial magnitudes $I_{DR-INITIAL}$.

The light output of the emitter modules 610 may decrease as the emitters 611-615 age. The light source control circuit 640 may be configured to increase the magnitudes of the drive current $I_{DR}$ for the emitters 611-615 to adjusted magnitudes $I_{DR-ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Patent Application Publication No. 2015/0382422, published Dec. 31, 2015, entitled ILLUMINATION DEVICE AND AGE COMPENSATION METHOD, the entire disclosure of which is hereby incorporated by reference.

What is claimed is:

1. An illumination device comprising:

a first plurality of LED emitters, the first plurality including five or more LED emitters;

wherein each of the LED emitters produces a luminous output having a different wavelength; and wherein each of the LED emitters included in the first plurality of the LED emitters is disposed at equal angles about first circle having a first radius from a center point; and a second plurality of LED emitters, the second plurality including five or more LED emitters wherein each of the LED emitters included in the second plurality of LED emitters produces a luminous output having a wavelength the same as respective ones of the first plurality of LED emitters;

wherein each of the LED emitters is disposed at equal angles about second circle having a second radius from the center point, the second radius greater than the first radius; and wherein the LED emitters disposed on the first circle and on the second circle and having the same wavelength output are disposed at an angle of 180 degrees opposed with respect to each other.

2. The illumination device of claim 1, further comprising:

at least one photosensitive element, the at least one photosensitive element disposed about a third circle having a third radius greater than the second radius.

3. The illumination device of claim 2 wherein the at least one photosensitive element includes at least one of:

a silicon diode; or a light-emitting diode.

4. The illumination device of claim 3 wherein the at least one photosensitive element includes a plurality of photosensitive elements.

5. The illumination device of claim 4 wherein the plurality of photosensitive elements includes:

a first LED having a first wavelength detection range; and a second LED having a second wavelength detection range that is different than the first wavelength detection range.

6. The illumination device of claim 2 further comprising:

an optical element having a fourth radius greater than the third radius disposed over the first plurality of LED emitters, the second plurality of LED emitters, and the at least one photosensitive element.

7. The illumination device of claim 6 wherein the optical element comprises a hemispherical optical element having a diameter equal to twice the fourth radius.

8. The illumination device of claim 6, further comprising:

a reflector disposed about the optical element;

wherein the reflector includes:

an open first end having first center point and a first diameter; and an open second end having a second center point second diameter that is greater than the first diameter; and wherein the center point of the first plurality of LED emitters and the second plurality of LED emitters aligns with the first center point and the second center point.

9. The illumination device of claim 8 wherein the reflector comprises a parabolic reflector.

10. The illumination device of claim 9 wherein the reflector further comprises a plurality of lunes extending at least partially from the first end of the reflector to the second end of the reflector.

11. The illumination device of claim 8, further comprising:

a lens extending across the open second end of the reflector.

12. The illumination device of claim 11, further comprising:

a plurality of lenslets disposed across at least a portion of at least one surface of the lens.

13. The illumination device of claim 2, further comprising:

LED drive circuitry operatively coupled to the first plurality of LED emitters and the second plurality of LED emitters, the LED drive circuitry to adjust at least one of:

an output intensity of the illumination device; or an output color temperature of the illumination device.

14. The illumination device of claim 8 wherein the LED drive circuitry to further:

generate at least one feedback signal that includes:

information representative of at least one operating parameter associated with at least a portion of the first plurality of LED emitters; and information representative of at least one operating parameter associated with at least a portion of the second plurality of LED emitters.

15. The illumination device of claim 14, further comprising:

LED drive control circuitry operatively coupled to the LED drive circuitry and to the at least one photosensitive element, the LED drive control circuitry to:

receive the at least one feedback signal from the LED drive circuitry;

receive an illumination device target output parameter that includes at least one of:

a target output intensity of the illumination device; or a target output color temperature of the illumination device; and generate at least one control signal using:

the received illumination device target output parameter;

the at least one feedback signal received from the LED drive circuitry;

one or more operating parameters for each respective one of the first plurality of LED emitters; and one or more operating parameters for each respective one of the second plurality of LED emitters; and cause a communication of the generated at least one control signal to the LED drive circuitry.

16. The illumination device of claim 15 wherein the at least one control signal includes, for each emitter included in the first plurality of LED emitters and for each emitter included in the second plurality of LED emitters, at least one of:

a drive voltage for the respective LED emitter; or a drive current for the respective LED emitter.

17. The illumination device of claim 11 wherein to generate the at least one control signal, the LED control circuitry to further:

receive at least one luminous output feedback signal from the at least one photosensitive element for each respective one of the first plurality of LED emitters and for each respective one of the second plurality of LED emitters; and generate the at least one control signal using the received at least one luminous output feedback signal.

* * * * *